United States Patent
Ryon et al.

(10) Patent No.: US 10,202,871 B2
(45) Date of Patent: Feb. 12, 2019

(54) STRAINERS

(71) Applicant: Delavan Inc, West Des Moines, IA (US)

(72) Inventors: Jason A. Ryon, Carlisle, IA (US); Brett A. Pfeffer, Waukee, IA (US); Mark A. Caples, Ankeny, IA (US)

(73) Assignee: Delavan Inc., West Des Moines, IA (US)

( * ) Notice: Subject to any disclaimer, the term of this patent is extended or adjusted under 35 U.S.C. 154(b) by 443 days.

(21) Appl. No.: 14/996,128

(22) Filed: Jan. 14, 2016

(65) Prior Publication Data

US 2017/0204746 A1 Jul. 20, 2017

(51) Int. Cl.
*F02C 7/22* (2006.01)
*F01D 25/32* (2006.01)
*B01D 29/58* (2006.01)
*B01D 29/35* (2006.01)
*B01D 29/33* (2006.01)
*B01D 35/00* (2006.01)
*F23K 5/18* (2006.01)

(52) U.S. Cl.
CPC ............. *F01D 25/32* (2013.01); *B01D 29/33* (2013.01); *B01D 29/35* (2013.01); *B01D 29/58* (2013.01); *B01D 35/005* (2013.01); *F02C 7/222* (2013.01); *F23K 5/18* (2013.01); *F05D 2260/607* (2013.01)

(58) Field of Classification Search
CPC .... F02C 7/222; F01D 25/32; F05D 2260/607; F23K 5/18; B01D 29/33; B01D 29/336; B01D 29/58; B01D 29/0054; B01D 29/0059; B01D 2275/201
See application file for complete search history.

(56) References Cited

U.S. PATENT DOCUMENTS 2,068,837 A * 1/1937 Aronson ............... B01D 35/02
                                                        210/314
2,761,529 A * 9/1956 Wsenbaugh .......... B60T 17/002
                                                        210/314
3,592,768 A    7/1971 Parker
(Continued)

FOREIGN PATENT DOCUMENTS

WO    WO-2014174323 A1    10/2014

OTHER PUBLICATIONS

V. Navrotsky presentation on 3D Printing at Siemans Power Service, Additive Manufacturing/3D Printing/SLM, enabling a revolution in spare parts repaired manufacturing.
(Continued)

*Primary Examiner* — Carlos A Rivera
(74) *Attorney, Agent, or Firm* — Locke Lord LLP; Daniel J. Fiorello; Scott D. Wofsy

(57) ABSTRACT

A strainer body strainer body has a conical or bullet-like shape and includes a tip portion, a midsection, and a base portion. The midsection connects the tip portion to the base portion such that the tip portion, midsection, and base portion are aligned with one another along a straining axis defined by the strainer body. The strainer body includes a plurality of layers fused to one another and angled relative to the straining axis. The plurality of layers define flow passages that extend through the strainer body to impound particulate entrained in fluid traversing the strainer body through the flow passages of the strainer body.

13 Claims, 9 Drawing Sheets

(56) References Cited

U.S. PATENT DOCUMENTS

| | | | | |
|---|---|---|---|---|
| 3,872,012 | A | * | 3/1975 | Endicott ................ B01D 29/58 210/297 |
| 4,003,836 | A | * | 1/1977 | Stearns ................ B01D 29/114 210/247 |
| 4,649,950 | A | * | 3/1987 | Bradley ................ B01D 35/04 137/549 |
| 2003/0089233 | A1 | * | 5/2003 | Borla ................ B01D 46/2403 95/273 |
| 2011/0309013 | A1 | * | 12/2011 | Elder .................... B01D 29/03 210/456 |
| 2015/0354242 | A1 | * | 12/2015 | Saccoccio ............ E04H 4/1272 210/806 |

OTHER PUBLICATIONS

Search Report from Intellectual property Office dated Jun. 19, 2017 for Application No. GB1700035.7.

* cited by examiner

STRAINERS

BACKGROUND OF THE INVENTION

1. Field of the Invention

The present disclosure relates to fluid systems, and more particularly to strainers for removing particulate entrained in fluid flowing through fluid systems.

2. Description of Related Art

Aircraft commonly employ fluid systems to provide fluid flows to devices like actuators, heat exchangers, and/or combustors. Since fluid traversing such fluid systems can include entrained particulate material, some fluid systems employ fluid strainers to arrest entrained particulate material. Such fluid strainers generally include a straining element with flow apertures sized to prevent entrained particulate from traversing the strainer. The flow apertures typically prevent entrained material from being carried into relatively fine features of downstream structures, such as valves or slots, by arresting entrained materials that are larger than the flow apertures. In the past such fluid strainers have generally been assembled by positioning a perforated structure cut from a wire or mesh material on a frame, and thereafter mechanically fixing the perforated structure to the frame using an external fastener like a screw or a cap, or may be pressed into the frame. The screw or cap is typically removable and fixes the perforated structure to the frame. Other fluid strainers have apertures defined by drilled holes in an otherwise solid structure. The drilled holes allow fluid to traverse the structure, and arrest entrained particulate that is larger than the drilled holes on the upstream side of the structure.

Such conventional strainers and strainer assemblies have generally been considered satisfactory for their intended purpose. However, there is still a need in the art for improved strainers and strainer assemblies. The present disclosure provides a solution for this need.

SUMMARY OF THE INVENTION

A strainer body strainer body has a conical or bullet-like shape and includes a tip portion, a midsection, and a base portion. The midsection connects the tip portion to the base portion such that the tip portion, midsection, and base portion are aligned with one another along a straining axis defined by the strainer body. A plurality of layers defining the strainer body are fused to one another, and can further be angled relative to the straining axis. The plurality of layers define flow passages that extend through the strainer body to impound particulate entrained in fluid traversing the strainer body through the flow passages of the strainer body.

In certain embodiments, the fused layers can define the tip portion, the midsection, and the base portion of the strainer body. The fused layers can be angled relative to the straining axis. The fused layers can be angle at 90-degree angle relative to the straining axis. The fused layers can define an exterior surface of the strainer body. The fused layers can define an interior surface of the straining body that bounds a hollow interior of the strainer body. An overhang angle of the strainer body defined by the intersection of a line tangent to the strainer body exterior surface and the straining axis can be greater than 45-degrees. A tip of a concave or convex profile of the strainer body can be lie on the straining axis of the strainer body.

In accordance with certain embodiments, one or more of the flow passages can define a non-circular flow area. The flow area can have an oblong or elliptical shape. The oblong or elliptical flow area can define a major axis. The major axis can extend in the direction of the straining axis. One or more of the flow passages can define a flow area with a polygonal shape. The polygonal flow area shape can be triangular, square, rectangular, or hexagonal. It is also contemplated that one or more of the flow passages can define a passage axis. The passage axis can be skew with respect to the straining axis. The passage axis can be parallel to the straining axis. The passage axis can intersect straining axis.

It is also contemplated that, in accordance with certain embodiments, one or more of the flow passages can be bounded a planar surface within a wall of the strainer body. One or more of the flow areas can taper between the exterior surface of the strainer body and the interior surface of the strainer body. The flow area can taper from a large flow area adjacent the exterior surface of the strainer body to a small flow area adjacent the interior surface of the strainer body. The flow area can taper from a small flow area adjacent the exterior surface of the strainer body to a large flow area adjacent the interior surface of the strainer body.

A strainer element includes a plurality of strainer bodies as described above. A first of the strainer bodies is axially stacked with a second of the plurality of strainer bodies along the straining axis. The tip of the second strainer body can be disposed within the interior of the first strainer body. Each of the flow passages of the first strainer body can define a flow area that is larger than the flow area of each of the flow passages of the second strainer body. The tip of the first strainer body can face into the direction of fluid traversing the strainer element. The tip of the first strainer body can face away from the direction of fluid traversing the strainer element.

A strainer includes a housing and a strainer body and/or straining element as described above. The housing has a flow channel extending between a channel inlet on an inlet end of the housing and a channel outlet on an outlet end of the housing. The strainer body is fixed within the housing such that an inner surface of the flow channel is sealed about the base portion of the strainer body. The tip of the strainer body can be adjacent to the channel inlet of the housing. The tip of the strainer body can be adjacent to the channel outlet of the housing. In certain embodiments, a trim flow orifice can be defined within the flow channel. The trim orifice can be between the strainer body and the channel inlet. The trim orifice can define a flow area that is smaller than the channel inlet of the housing. The trim flow passage can define a flow area that is smaller than an aggregate flow area defined by the flow passages of the strainer body. The strainer body can be fixed within the fluid channel by a collar extending about the base portion of the strainer body. It is also contemplated that a plurality of fused layers forming the strainer body can extend into the strainer housing. The layers can axially seal the strainer body within the fluid channel of the housing.

A fuel injector for a gas turbine engine includes a nozzle body with a fuel circuit, a support with a fuel conduit, and a strainer body as described above. Flow passages of the strainer body can be in fluid communication with fuel conduit of the support, and the fuel conduit of the support can be in fluid communication with the nozzle body of the fuel circuit. Flow passages of the strainer body can be smaller than flow passages within the nozzle body such that particulate entrained in fuel flowing to the fuel circuit of the nozzle body is impounded in the strainer body.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
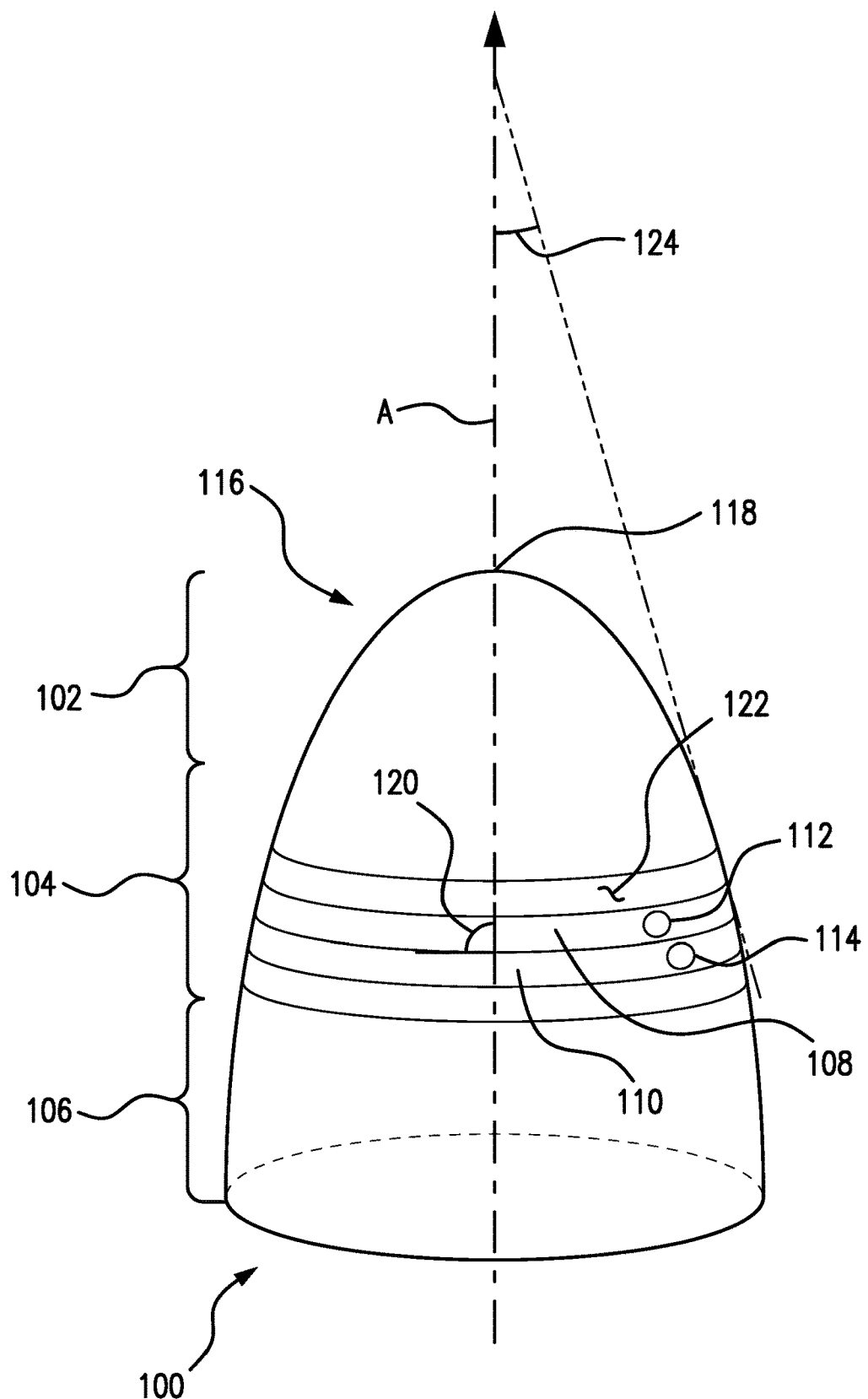
FIG. 1 is a schematic side elevation view of an exemplary embodiment of a strainer body constructed in accordance with the present disclosure, showing the shape of the strainer body.
Figure 2A:
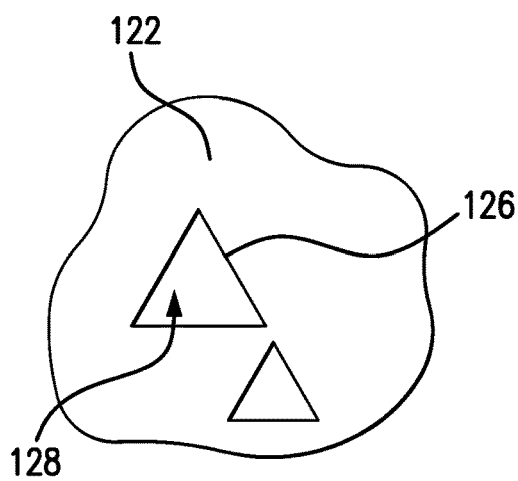
FIGS. 2A-2E are schematic plan views of the strainer body of FIG. 1, showing exemplary shapes of flow areas defined by flow passages of the strainer body.
Figure 2B:
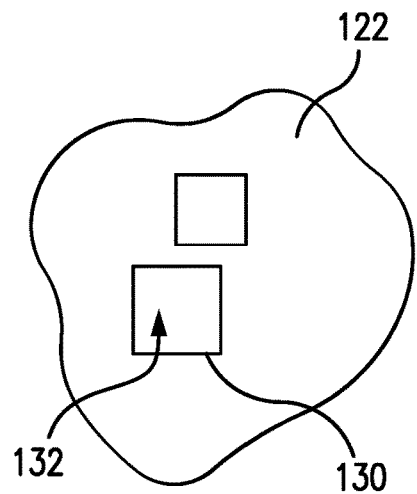
Figure 2C:
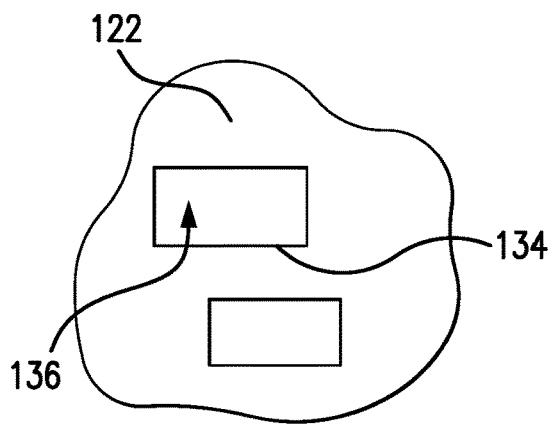
Figure 2D:
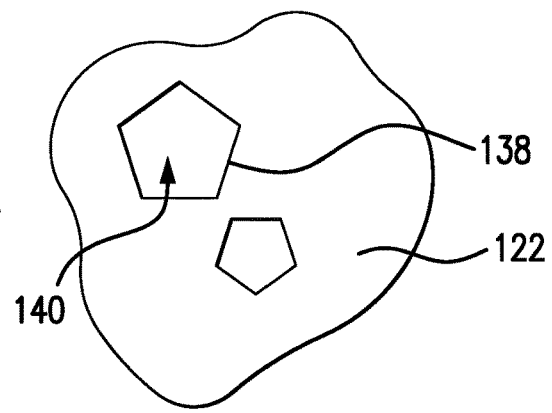
Figure 2E:
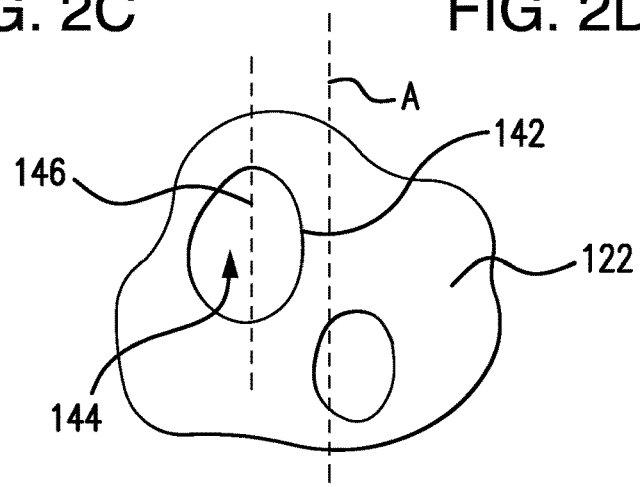

Reference will now be made to the drawings wherein like reference numerals identify similar structural features or aspects of the subject disclosure. For purposes of explanation and illustration, and not limitation, a partial view of an exemplary embodiment of a strainer body in accordance with the disclosure is shown in FIG. 1 and is designated generally by reference character 100. Other embodiments of strainer bodies, strainer elements, strainers, and fuel injectors including such devices in accordance with the disclosure, or aspects thereof, are provided in FIGS. 2-9, as will be described. Strainer bodies, strainer elements, and strainers as described herein can be used to improve fluid system performance by reducing weight and/or parts count, simplifying manufacture, and/or prolonging operating intervals between cleaning cycles in fuel systems for gas turbine engines. However, it is to be understood and appreciated that the invention described herein is not limited to gas turbine engines or to fuel systems generally.

Referring to FIG. 1, strainer body 100 is shown. Strainer body 100 includes a tip portion 102, a midsection 104, and a base portion 106. Tip portion 102, midsection 104, and base portion 106 are each arranged along a straining axis A. Midsection 104 connects tip portion 102 to base portion 106 and includes a plurality of layers fused to one another, e.g., a first layer 108 and a second layer 110. The plurality of fused layers are angled relative to straining axis A and define a plurality of flow passages, e.g., a first flow passage 112 and a second flow passage 114, that extend through strainer body 100.

Strainer body 100 has a conical or bullet-like shape 116. The conical or bullet-like shape 116 extends between axially opposite ends of tip portion 102 and base portion 106 of strainer body 100. In the illustrated exemplary embodiment, strainer body 100 has a parabolic profile with a tip 118 arranged along straining axis A such that tip portion 102, midsection 104, and base portion 106 are coaxially aligned with one another along straining axis A. The plurality of fused layers, e.g., first layer 108 and second layer 110, are axially stacked layers along straining axis A and form substantially the entire structure of strainer body 100 extending between opposite ends of tip portion 102 and base portion 106 of strainer body 100.

The plurality of axially stacked layers are angled relative to straining axis A, indicated in an exemplary manner by angle 120, which is about a 90-degree angle. Laterally opposite to straining axis A, the plurality of fused layers define an exterior surface 122 of strainer body 100 that extends about straining axis A. Exterior surface 122 is inclined relative to straining axis A such that an overhang angle 124 of strainer body 100, defined at an intersection of a line tangent 126 to exterior surface 122 and straining axis A, is greater than 45-degrees. Overhang angles greater than about 45-degrees facilitate fabrication of strainer body 100 using an additive manufacturing technique. Use of additive manufacturing techniques in turn allows flow passages of strainer body 100, e.g., first flow passage 112 and/or second flow passage 114, to define a non-circular flow area as further described below.

With reference to FIGS. 2A-2E, exemplary non-circular flow areas defined by flow passages of strainer body 100 are shown. With reference to FIGS. 2A-2D, flow passages defining flow areas with polygonal shape are shown. With respect to FIG. 2A, a flow passage 126 is shown having a triangular flow area shape 128. With respect to FIG. 2B, a flow passage 130 is shown having a square flow area shape 132. With respect to FIG. 2C, a flow passage 134 is shown having a rectangular flow area shape 136. With respect to FIG. 2D, a flow passage 138 is shown having a hexagonal flow area shape 140. With respect of FIG. 2E, a flow passage 142 is shown having an oblong or elliptical flow area shape 144. Elliptical flow area shape 144 defines a major axis 146, which extends in the same direction as straining axis A. As will be appreciated by those of skill in the art in view of the present disclosure, non-circular flow areas such as those illustrated in FIGS. 2A-2E enable strainer to impound particulate entrained in fluid traversing strainer body 100 of size that is smaller than that of the non-circular flow area.

Figure 3A:
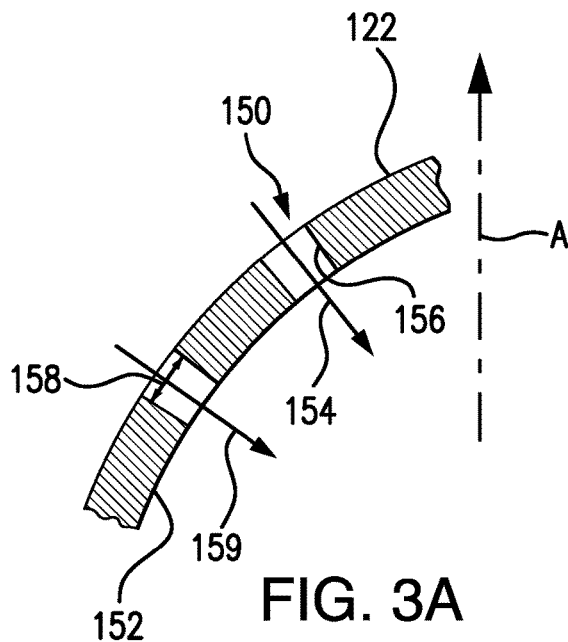
FIGS. 3A-3D are schematic cross-sectional views of the strainer body of FIG. 1, showing exemplary flow passages extending through the strainer body.

Referring to FIGS. 3A-3D, exemplary flow passages are shown. With reference to FIG. 3A, a flow passage 150 is shown extending between exterior surface 122 and an interior surface 152. Interior surface 152 bounds a hollow interior of strainer body 100 and is fluid communication with the external environment opposite exterior surface 122 through flow passage 150. Flow passage 150 defines a flow axis 154 that is angled relative to straining axis A, which may be an oblique angle. One or more of the flow axes defined may be skew relative to straining axis A, as shown with flow axis 159. In the illustrated exemplary embodiment flow passage 150 is bounded by parallel sidewalls 156 that define a flow area of substantially uniform flow area 158 extending through strainer body 100. One or more of sidewalls 156 may be a planar surface.

Figure 3B:
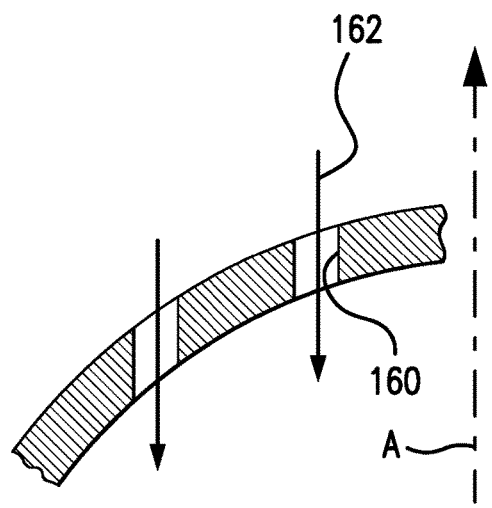

With reference to FIG. 3B, a flow passage 160 is shown. Flow passage 160 is similar to flow passage 150 with the difference that a flow axis 162 defined by flow passage 160 is parallel to straining axis A. Sidewalls bounding flow passage 160 may be parallel to straining axis A.

Figure 3C:
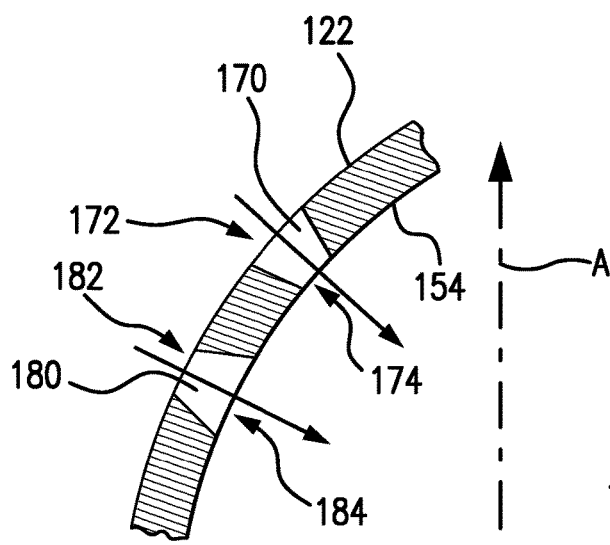

With respect to FIG. 3C, a flow passage 170 and a flow passage 180 are shown. Flow passage 170 is similar to flow passage 150 with the difference that flow passage 170 tapers at its axial length from a large flow area 172, defined adjacent exterior surface 122, to a small flow area 174, defined adjacent interior surface 154. Flow passage 180 is also similar to flow passage 150 with the difference that flow passage 180 tapers at its axial length from a small flow area 182, defined adjacent exterior surface 122, to a large flow area 184, defined adjacent interior surface.

Figure 3D:
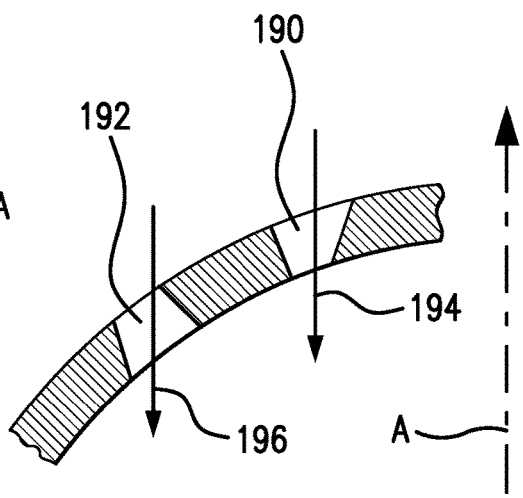

With reference to FIG. 3D, a flow passage 190 and a flow passage 192 are shown. Flow passage 190 is similar to flow passage 170, and additionally includes a flow axis 194 that is parallel to straining axis A. Flow passage 192 is similar to flow passage 180, and additionally includes a flow axis 196 that is also parallel to straining axis A.

Figure 4:
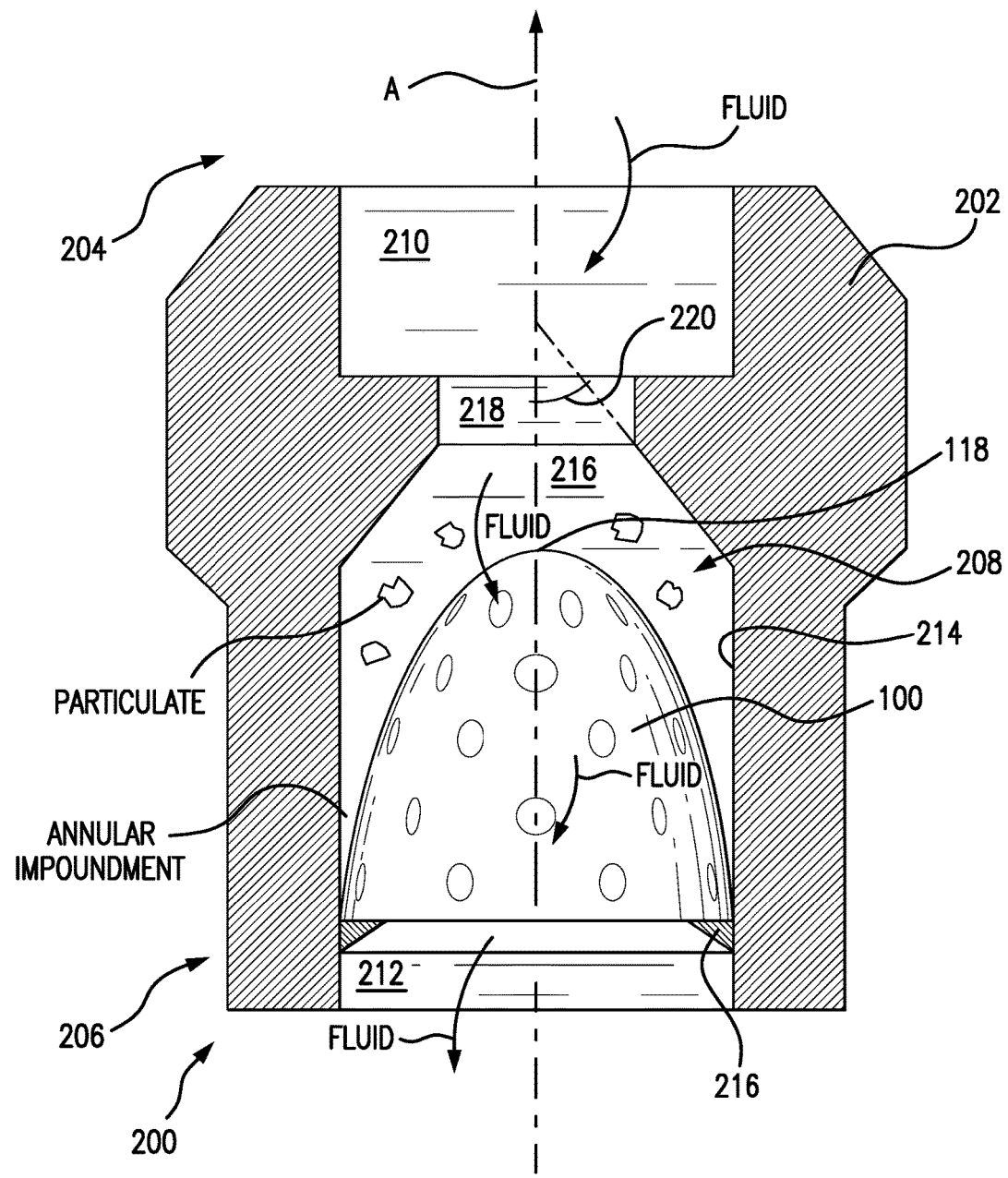
FIG. 4 is a schematic cross-sectional view of a strainer including the strainer body of FIG. 1, showing the tip of the strainer body facing a channel inlet of the strainer housing.

With reference to FIG. 4, a strainer 200 is shown. Strainer 200 includes strainer body 100 and a housing 202. Housing 202 has an inlet end 204, an opposed outlet end 206, and defines within its interior a flow channel 208. Flow channel 208 extends between a channel inlet 210 defined on inlet end 204 and a channel outlet 212 defined on outlet end 206. Strainer body 100 is arranged within flow channel 208 between inlet end 204 and outlet end 206 such that channel inlet 210 is in fluid communication with channel outlet 212 through the plurality of flow passages extending through strainer body 100 e.g., first flow passage 112 (shown in FIG. 1) and second flow passage 114 (shown in FIG. 1). In this respect strainer body 100 is oriented within flow channel 208 such that tip 118 is adjacent to (e.g., faces) channel inlet 210 and on a side of strainer body 100 opposite channel outlet 212. This causes particulate entrained in fluid traversing strainer body 100 to collect in an annular impoundment defined between exterior surface 122 and an interior surface 214 of flow channel 208.

Flow channel 208 defines a trim orifice 218. Trim orifice 218 is defined within flow channel 208 such that trim orifice 218 is interposed between strainer body 100 and channel inlet 210. Trim orifice 218 has a flow area that is smaller than a minimum flow area of channel inlet 210. Trim orifice 218 also has a flow area that is smaller than an aggregate flow area of the plurality of flow passages, e.g., first flow passage 112 (shown in FIG. 1) and second flow passage 114 (shown in FIG. 1), extending through strainer body 100.

In the illustrated exemplary embodiment, strainer 200 includes a collar 216. Collar 216 seats in outlet end 206 and fixes strainer body 100 within flow channel 208, thereby sealably coupling base portion 106 of strainer body 100 against interior surface 214 of housing 202. It is contemplated that this seals the annular impoundment in the axial direction, preventing entrained particulate from traversing strainer body 100.

Figure 5:
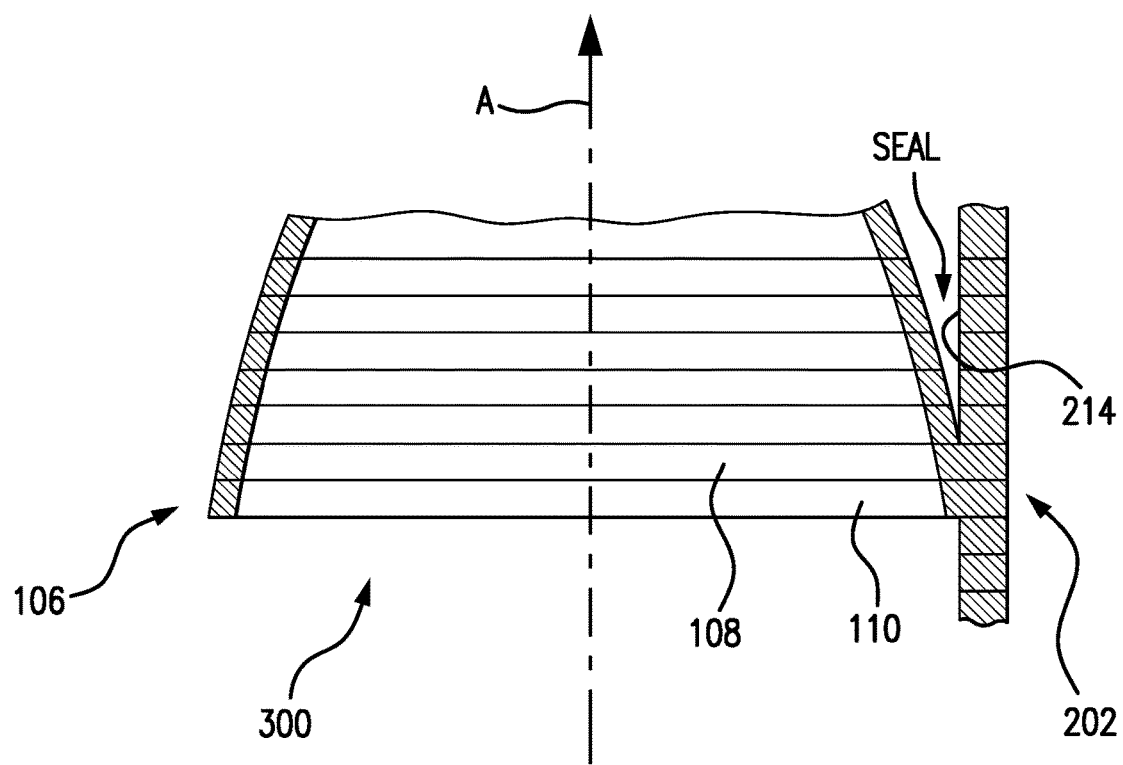
FIG. 5 is a schematic cross-sectional view a strainer including the strainer body of FIG. 1, showing a strainer housing with an integral strainer body.

A portion of interior surface 214 can be angled relative straining axis A between trim orifice 218 and channel outlet 212 such that an overhang angle 220 is greater than 45-degrees. Overhang angles greater than 45-degrees, e.g., overhang angle 220, allow for fabricating housing 202 using an additive manufacturing technique. It is contemplated that both housing 202 and strainer body 100 can be fabricated at the same time using an additive manufacturing technique. In this respect, housing 202 and strainer body 100 could include a plurality of layers, e.g., first layer 108 and second layer 110, that are fused to one another and, as shown in FIG. 5, extend laterally relative to straining axis A into housing 202. This define a seal between base portion 106 of strainer body 100 and interior surface 214 of housing 202, as shown in exemplary strainer 300.

Figure 6:
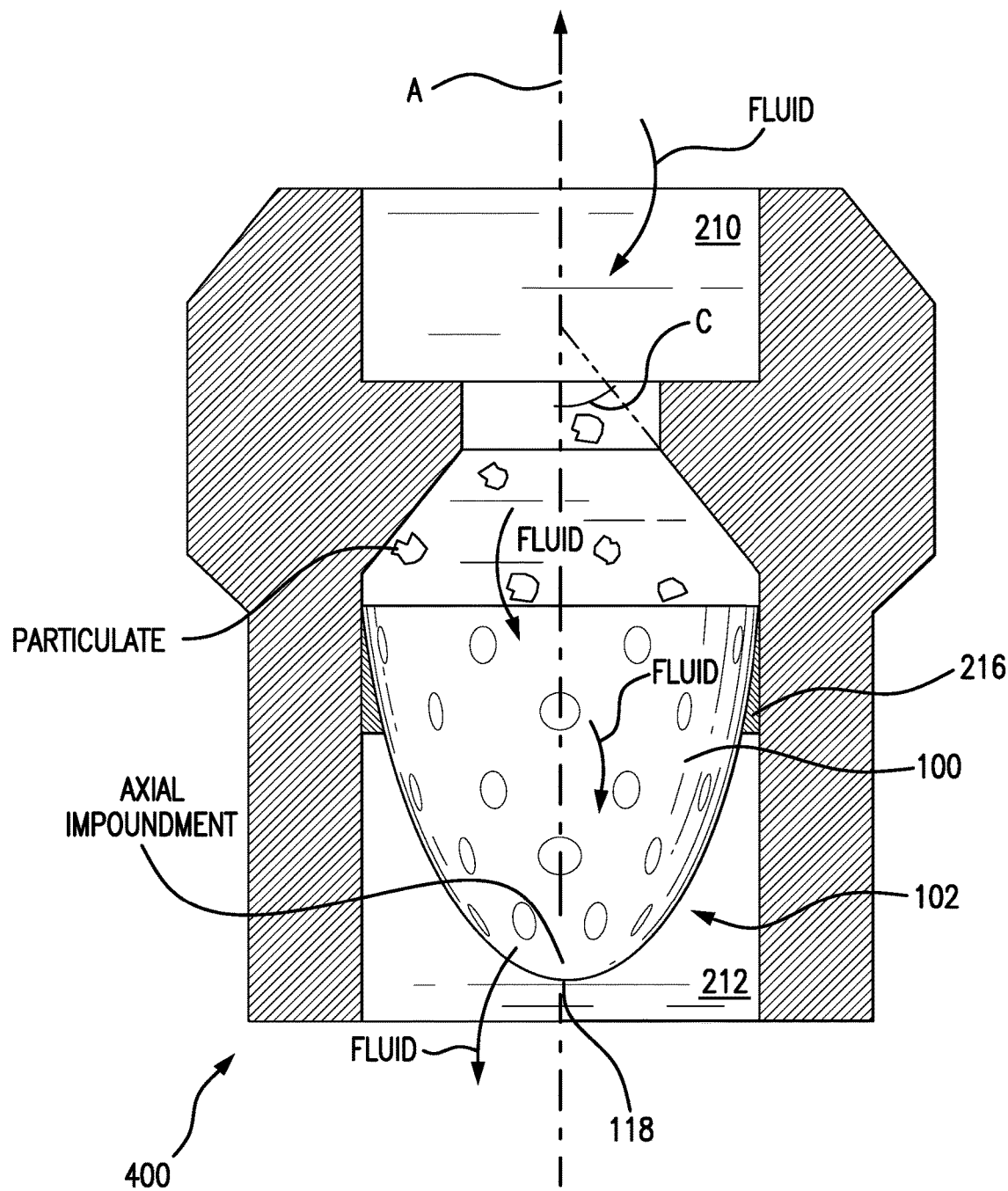
FIG. 6 is a schematic cross-sectional view of a strainer including the strainer body of FIG. 1, showing the tip of the strainer body facing a channel outlet of the strainer housing.

With reference to FIG. 6, a strainer 400 is shown. Strainer 400 is similar to strainer 200 (shown in FIG. 4) and additionally includes a strainer body 100 fixed within flow channel 208 such that tip 118 is adjacent to (e.g., faces) channel outlet 212. This causes particulate entrained in fluid entering channel inlet 210 to be impounded in an axial impoundment, defined within an interior of tip portion 102 of strainer body 100, disposed along straining axis A.

Figure 7:
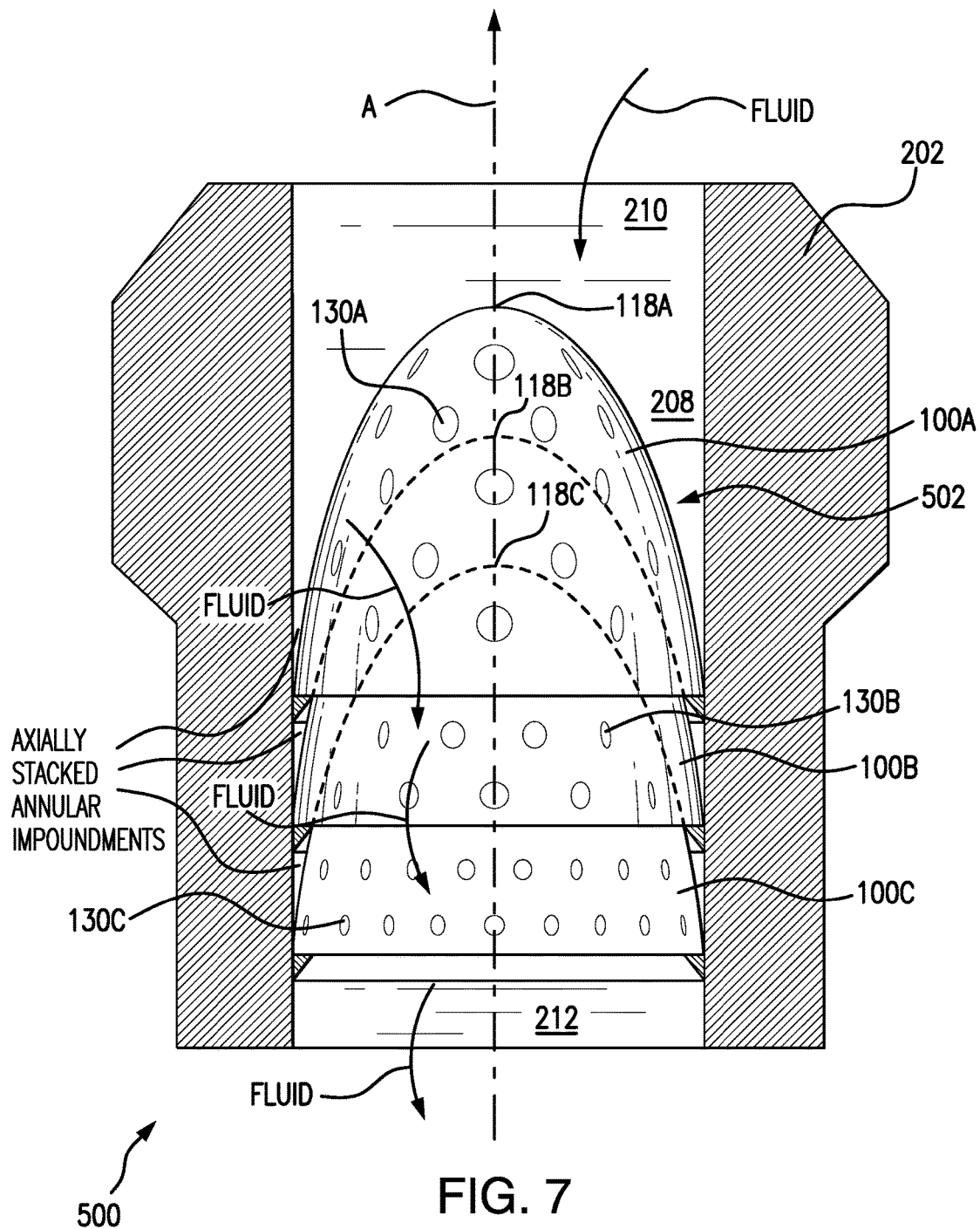
FIG. 7 is a schematic cross-sectional view of a strainer with the strainer body of FIG. 1, showing a strainer element with axially stacked strainer bodies facing the channel inlet.

With reference to FIG. 7, a strainer 500 is shown. Strainer 500 is similar to strainer 200 (shown in FIG. 4) and additionally includes a strainer element 502 having a plurality of axially stacked strainer bodies. In this respect strainer element 502 includes a first strainer body 100A, a second strainer body 100B, and a third strainer body 100C. First strainer body 100A is similar to strainer body 100 (shown in FIG. 1) and is seated within flow channel 208 such that a tip 118A of first strainer body 100A is adjacent to (e.g., faces) channel inlet 210. Second strainer body 100B is also similar to strainer body 100, and is seated between tip 118A of first strainer body 100A and channel outlet 212. Third strainer body 100C is additionally similar to strainer body 100 and is seated between a tip 118B of second strainer body 100B and channel outlet 212. Axially stacking first strainer body 100A, second strainer body 100B, and third strainer body 100C of strainer element 502 within flow channel 208 creates an axially stacked arrangement of annular particulate impoundments, increasing the amount of entrained particulate that strainer 500 may impound before presenting significant resistance to fluid traversing strainer 500.

It is contemplated that strainer element 502 can be a graduated strainer element. In this respect first strainer body 100A can have flow passages that each define a respective a first flow area 130A, second strainer body 100B can have flow passages that each define a respective second flow area 130B that is unequal to first flow area 130A, and third strainer body 100C can have flow passages that each define a third flow area 130C that is unequal to that of both first flow area 130A and second flow area 130B. The flow areas of the strainer bodies can decrease axially, on a by-strainer basis, along straining axis A, first flow area 130A being greater than second flow area 130B and second flow area 130B being greater than third flow area 130C. This segregates impounded particulate by size by size in the axially distributed annular particulate impoundments, increasing the capacity of the strainer to retain particulate before presenting significant resistance to fluid traversing strainer 500.

In the illustrated exemplary embodiment the strainer bodies of strainer element 502 axially overlap one another. In this respect second strainer body 100B is nested within first strainer body 100A such that a tip 118B of second strainer body 100B is disposed within an interior of first strainer body 100A. Third strainer body 100C is nested within second strainer body 100B such that tip 118C of third strainer body 100C is disposed within an interior of second strainer body 100B. This reduces the axial height of strainer element 502, allowing strainer 500 to have a compact footprint. As will be appreciated by those of skill in the art in view of the present disclosure, the amount of axial overlap can be a function of the distribution particle size in a given application. As will also be appreciated by of skill in the art in view of the present disclosure, the strainer bodies of strainer element 502 may be fixed within flow channel 208 via collars (as shown), or through layers (shown in FIG. 5) spanning both a respective strainer body and housing 202.

Figure 8:
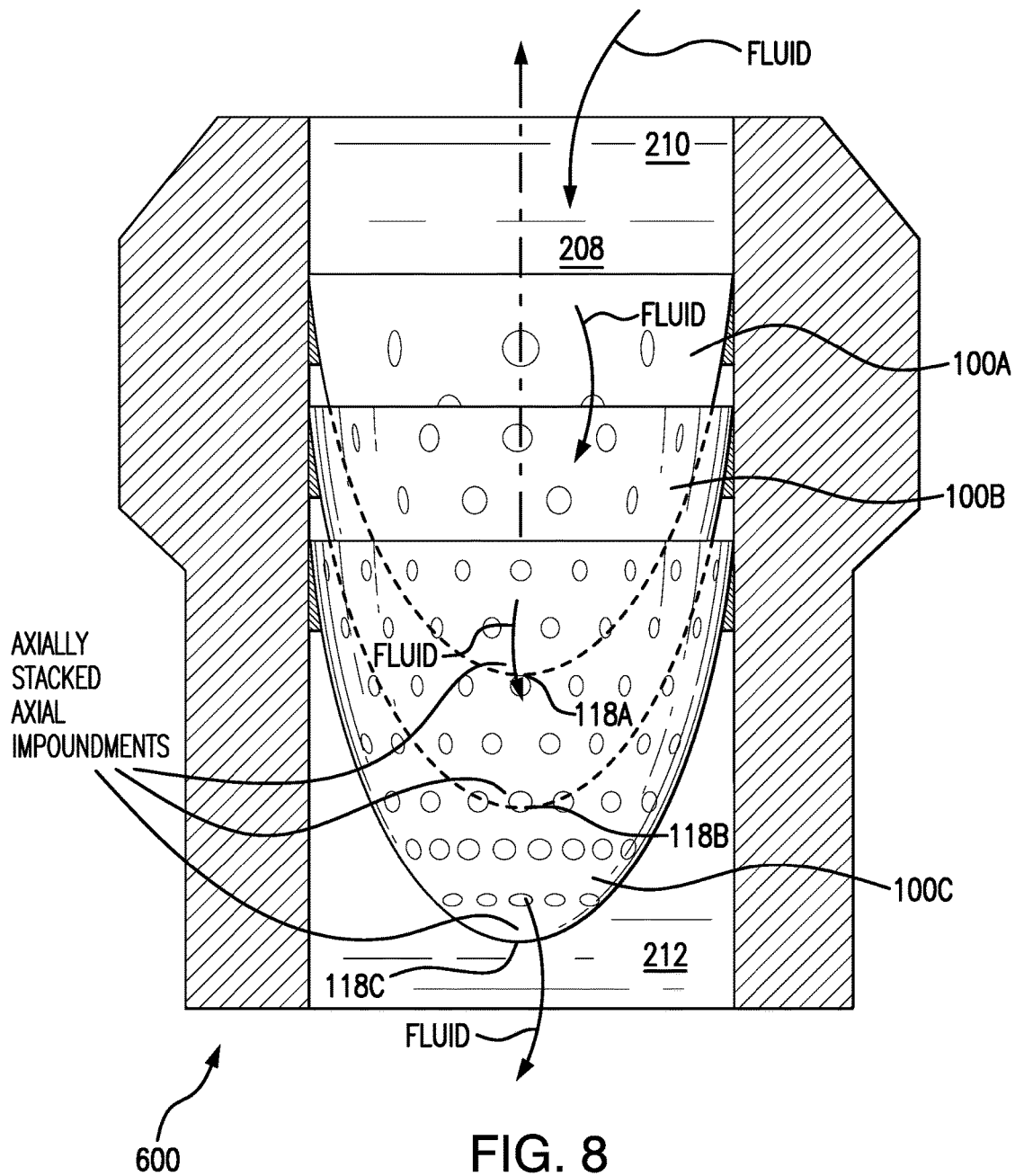
FIG. 8 is a schematic cross-sectional view of a strainer with the strainer body of FIG. 1, showing a strainer element with axially stacked strainer bodies facing the channel outlet.

With reference to FIG. 8, a strainer 600 is shown. Strainer 600 is similar to strainer 500 (shown in FIG. 7), and additionally includes a strainer element 602 having strainer bodies arranged within flow channel 208 with strainer body facing towards channel outlet 212. In this respect tip 118C of third strainer body 100C is disposed between tip 118B of second strainer body 100B and channel outlet 212 such that it faces channel outlet 212. Tip 118A of first strainer body 100A is disposed between channel inlet 210 and tip 118B of second strainer body 100B. An interior of first strainer body 100A faces channel inlet 210. As a consequence of the arrangement, each strainer body defines between its interior surface and channel inlet 210 an axial impoundment, each axial impoundment being stacked along straining axis A with the other axial impoundments formed by the other strainer bodies.

Figure 9:
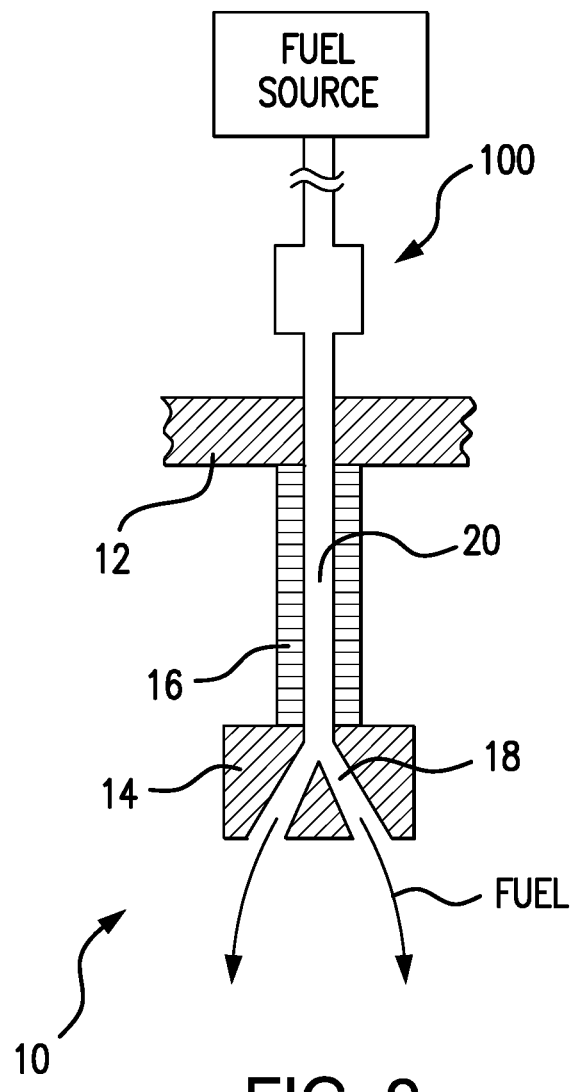
FIG. 9 is a schematic view of a fuel injector for a gas turbine including the strainer body of FIG. 1, showing the strainer body impounding entrained particulate in a fuel flow.

With reference to FIG. 9, a fuel injector 10 for a gas turbine engine is shown. Fuel injector 10 is arranged within a combustor 12 and includes a nozzle body 14, a support 16, and a strainer body 100 as described above. A fuel source is in fluid communication with a fuel circuit 18 within nozzle body 14 through a fluid conduit 20 within support 16 strainer body 100. Strainer body 100 is arranged to within the flow between the fuel source and nozzle body 14 to impound entrained particulate in fluid flowing therebetween to prevent the entrained particulate from lodging within structures defined within fuel circuit 18 of nozzle body 14.

The methods and systems of the present disclosure, as described above and shown in the drawings, provide for strainers with superior properties including reduced weight, improved performance, reduced part count, and/or longer cycle time between cleaning relative to conventional strainers. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A strainer, comprising:
    a strainer housing with a flow channel, wherein the flow channel extends between a channel inlet and a channel outlet; and
    a strainer body, including:
        a tip portion;
        a base portion opposite the tip portion; and
        a midsection connecting the base portion to the tip portion, wherein the strainer body has a conical or bullet-like shape defining a straining axis extending between the channel inlet and the channel outlet, the strainer body including a plurality of interfused layers extending laterally from the straining axis and defining a plurality of flow passages through the strainer body to impound particulate entrained in fluid traversing the strainer body through the plurality of flow passages;
    wherein the strainer body is sealably seated within the flow channel such that fluid traversing flow channel flows through the flow passages of the strainer body; and
    wherein at least two of the interfused layers forming the strainer body extend laterally from the strainer axis and form a portion of the strainer housing, a first of the layers defining an axially inner surface of the strainer body and an outer surface of the strainer housing.

2. The strainer body as recited in claim 1, wherein at least one of the base portion and the midsection of the strainer body define an overhang angle that is greater than about 45-degrees.

3. The strainer body as recited in claim 1, wherein the interfused layers are angled at about a 90-degree angle relative to the straining axis.

4. The strainer body as recited in claim 1, wherein at least one of the flow passages defines a non-circular flow area.

5. The strainer body as recited in claim 1, wherein at least one of the flow passages defines a flow area with a polygonal shape.

6. The strainer body as recited in claim 1, wherein at least one of the flow passages defines a flow area with an elliptical shape.

7. The strainer body as recited in claim 6, wherein a major of axis of the elliptically shaped flow area extends in the direction of the straining axis.

8. The strainer body as recited in claim 1, wherein at least one of the plurality of flow passages defines a flow area that tapers along an axis of the flow passage.

9. A The strainer body as recited in claim 1, wherein at least one of the plurality of flow passages is bounded by a planar sidewall defined within a wall of the strainer body.

10. The strainer as recited in claim 1, wherein a tip of the strainer faces a channel inlet of the flow channel.

11. The strainer as recited in claim 1, wherein a tip of the strainer faces a channel outlet of the flow channel.

12. A fuel injector for a gas turbine engine, comprising:
    a nozzle body with a fuel circuit;
    a support with a fuel conduit with the fuel circuit of the nozzle body; and
    a strainer body as recited in claim 1, wherein the plurality of the flow passages of the strainer body are in fluid communication with fuel circuit of the nozzle body through the fuel conduit of the support.

13. A strainer, comprising:
    a strainer housing with a flow channel, wherein the flow channel extends between a channel inlet and a channel outlet; and
    first and second strainer bodies, each strainer body including:
        a tip portion;
        a base portion opposite the tip portion; and
        a midsection connecting the base portion to the tip portion, wherein the strainer body has a conical or bullet-like shape defining a straining axis extending between the channel inlet and the channel outlet, the strainer body including a plurality of interfused layers extending laterally from the straining axis and defining a plurality of flow passages through the strainer body to impound particulate entrained in fluid traversing the strainer body through the plurality of flow passages;
    wherein the second strainer body is axially stacked with the first strainer body along the straining axis of the first strainer body, the straining axis extending between the channel inlet and the channel outlet,
    wherein a tip of the first strainer body faces the channel inlet of the flow channel,
    wherein a tip of the second strainer body is disposed within an interior of the first strainer body, wherein each of the flow passages of the first strainer body has a flow area that is greater than each flow area of the flow passage of the second strainer body, wherein the plurality of interfused layers of the first strainer body and the second strainer body extend into the strainer housing and sealably fix the strainer bodies within the flow channel; and wherein at least two of the interfused layers forming the first strainer body extend laterally from the strainer axis and form a portion of the housing, a first of the layers defining an axially inner surface of the first strainer body and an outer surface of the strainer housing.

* * * * *